UNITED STATES PATENT OFFICE.

TITUS SHEARD, OF LAKEWOOD, AND HERBERT E. WETHERBEE, OF CLEVELAND HEIGHTS, OHIO, ASSIGNORS TO THE DOLOMITE PRODUCTS COMPANY, OF CLEVELAND, OHIO, A CORPORATION OF OHIO.

REFRACTORY MATERIAL AND PROCESS OF MAKING SAME.

1,329,434.  Specification of Letters Patent.  Patented Feb. 3, 1920.

No Drawing.  Application filed September 19, 1918. Serial No. 254,759.

*To all whom it may concern:*

Be it known that we, TITUS SHEARD and HERBERT E. WETHERBEE, both citizens of the United States, and residents of Lakewood, county of Cuyahoga, State of Ohio, and of Cleveland Heights, county of Cuyahoga, and State of Ohio, respectively, have jointly invented a new and useful Improvement in Refractory Materials and Processes of Making Same, of which the following is a specification, the principle of the invention being herein explained and the best mode in which we have contemplated applying that principle, so as to distinguish it from other inventions.

As is well known, magnesite has proved to be especially suitable as a highly refractory material for use in lining furnaces such as are employed in steel manufacture, for example. In this connection, however, only the crystalline magnesite has been employed, and of the naturally occurring magnesite of this form, only those can be used which include a certain essential percentage of fluxing material. For this reason, heretofore, the Austrian magnesite, which fulfilled these necessary conditions, has met with no substantial competition, even in this country, despite the long distance it required to be transported; for while there are magnesite deposits more nearly at hand, they are not of a proper quality, being in fact too pure to be satisfactorily employed. As a result of the foregoing and the fact that the importation of the Austrian product is prohibited by war-time conditions, there have been a considerable number of substitutes proposed and actually placed on the market, some of which have met with a fair measure of success. Practically all of these substitutes are compounds having dolomitic lime as their base, some consisting merely of double burned or "dead burnt" dolomite, some of particles of dolomitic lime coated with a less-refractory material, such as slag, and some of such dolomitic lime and other ingredients synthetically compounded to form a new product.

The object of the present invention, in contradistinction to the substitutes just referred to, is synthetically to produce, by suitable chemical reactions from raw magnesian limestone or dolomite, a compound that may be made to approach as closely as desired to the composition and qualities of the Austrian magnesite. It is unnecessary to state that this material is superior in actual use to any of the aforesaid substitutes, the chief problem being the discovery of a method or process sufficiently simple in operation and inexpensive in the character of reagents required to render such synthetic product available for commercial use.

To the accomplishment of the foregoing and related ends, the invention, then, consists of the composition of matter and steps involved in the manufacture of the same hereinafter fully described and particularly pointed out in the claims, the following description setting forth in detail one approved method of carrying out the process, such disclosed mode, however, constituting but one of the various ways in which the principle of the invention may be used.

As already indicated, the base material used in the production of our newly discovered material is magnesian limestone or dolomite ($MgCO_3.CaCO_3$). In true dolomite, the two constituent elements, whether they constitute an isomorphous mixture, as at one time supposed, or a distinctive compound, are found in equi-molecular proportions, as indicated by the formula. In certain of the so-called magnesian limestones, on the other hand, smaller or larger proportions of the one carbonate, than of the other, may be present. Any of the foregoing naturally occurring minerals may be utilized in the present process, although dolomite will be assumed to be such material in the case of the formulæ and equations which follow.

The first step in the process is to burn such dolomite in a suitable kiln, preferably a rotary kiln, the material being preliminarily broken up into sufficiently small pieces to facilitate handling and burning. The result is the production of dolomitic lime consisting of calcium and magnesium oxids or a mixture of such oxids, as represented by the following equation:—

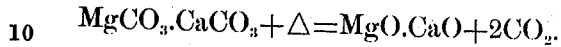
$$MgCO_3 \cdot CaCO_3 + \triangle = MgO \cdot CaO + 2CO_2.$$

These oxids, where relatively pure dolomite is used, readily form a fine powder, making it unnecessary to crush the material, after firing.

The next step is the elimination of more or less of such calcium oxid by treating the same with a reagent capable of reacting therewith to form a soluble compound. Incidentally to the foregoing, we preferably substitute a fluxing agent, such as iron hydrate, for the calcium. A suitable reagent for use in the foregoing step is hydrochloric acid which obviously need not be chemically pure, the same being added to the calcium-magnesium oxid in an amount calculated to displace the desired proportion of the former. The acid will be added in sufficiently dilute solution as to provide water for the hydration of the magnesium oxid, as well as any residual calcium oxid, the result being precipitation of such hydrates with calcium chlorid left in solution as per the following equation:

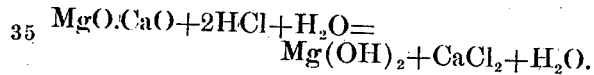
$$MgO \cdot CaO + 2HCl + H_2O = Mg(OH)_2 + CaCl_2 + H_2O.$$

As a much superior and more readily available reagent, we prefer to employ the waste liquor from galvanizing pickling vats, such liquor consisting of a relatively dilute solution of iron chlorids, both ferric chlorid and ferrous chlorid, together with a small quantity of free hydrochloric acid. This liquor is at present not merely a waste product at galvanizing plants, but a nuisance as well, since it requires to be chemically treated before it can be discharged. By treating calcium-magnesium oxid with such liquor, instead of with hydrochloric acid, any desired proportion of the calcium oxid may be converted into calcium chlorid, and at the same time the corresponding amount of iron hydrate substituted in the mixture. Such iron hydrate, in other words, precipitates out with the magnesium hydrate and the hydrate of any residual calcium, leaving the calcium chlorid in solution as before. The iron hydrate will be in the ferric or ferrous state, depending, of course, upon the form of the chlorid present in the solution used to treat the burned dolomite, and, if desired, such chlorids can be preliminarily converted entirely to one or the other, the ferrous chlorid, producing the ferrous hydrate, being regarded as preferable. The reactions involved in the foregoing treatment of the burned dolomite may be represented by the following equations:

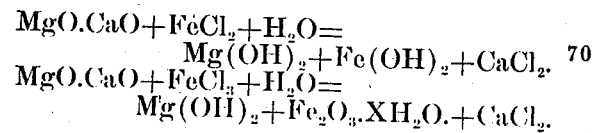
$$MgO \cdot CaO + FeCl_2 + H_2O =$$
$$Mg(OH)_2 + Fe(OH)_2 + CaCl_2.$$
$$MgO \cdot CaO + FeCl_3 + H_2O =$$
$$Mg(OH)_2 + Fe_2O_3 \cdot XH_2O + CaCl_2.$$

In the last equation it has not been attempted to indicate the exact composition of ferric hydrate, which is uncertain and variable, but merely to give an illustrative formula therefor that will balance the equation.

It will also be understood, of course, that the particular source of the active reagent in the solution used to treat the burned dolomite is a matter of indifference, and that other waste solutions from other manufacturing processes may be found to be suitable for the purpose in hand.

Where iron chlorid is the reagent used, the resulting iron hydrate will obviously be precipitated in very finely divided condition, and at the same time be thoroughly intermixed with the other solid constituents that precipitate out so as to produce a homogeneous mixture with these. Such combined precipitate is then separated from the calcium chlorid solution as, for example, by means of centrifugal machines, and the solid material thereupon either formed into bricks and burned, or made into granular form, i. e., nodules, and burned. The last mentioned operation will be conveniently carried out by introducing the material in sufficiently divided form into a rotary kiln, heated to the proper temperature, e. g. 1500° C., and as a result calcined nodules or granules will be produced. The manner of making brick from a plastic material, such as the precipitate in question constitutes, is too well understood to require description.

Preliminarily to thus burning the precipitate to form the final product, a small percentage of alumina or silica or both may be added to the same as an additional fluxing material. Fire clay or furnace slag will contain both of the specified ingredients in proper proportions for use in this connection.

By means of the foregoing steps, it is possible to produce synthetically a composition of matter having substantially identically the same analysis as Austrian magnesite. A refractory material, however, entirely satisfactory for use in open hearth furnaces and the like may be produced without eliminating all of the lime or even the major portion of it from the dolomite of which it may originally constitute one-half. By replacing only part of such calcium with iron and then adding the further fluxing material described, a product is obtained that will stand up satisfactorily under the most severe conditions of use. In other words, not only is such product substantially proof against the action of atmospheric air and moisture, so that it will stand shipment and storage without slaking, but it will have just the proper degree of fusibility to form a perfect lining for the floor and walls of the furnace.

The typical composition of calcined Austrian magnesite, which may be approached by our synthetic product as closely as desired is as follows, viz:—

| | |
|---|---|
| Magnesia | 86.0 |
| Lime | 1.5 |
| Silica | 3.0 |
| Alumina | 1.0 |
| Iron oxid | 8.5 |
| | 100.0 |

As a matter of fact, we consider that a product in which the magnesium oxid predominates in the proportion of four to one, i. e., eighty per cent. of magnesium oxid to twenty per cent. of calcium oxid, disregarding the other ingredients, would satisfactorily fulfill the conditions of use. Assuming that we are dealing with a raw dolomite containing forty-five per cent. of magnesium carbonate and fifty-five per cent. of calcium carbonate, upon calcination this will yield about forty per cent. of magnesium and sixty per cent. of lime. To reduce this to the proportion just indicated, about four-fifths of the lime will have to be eliminated. In such case, it would not be desirable to substitute iron oxid for all the lime thus eliminated, since the amount of the latter as indicated in the composition of the product derived from natural magnesite should be between eight and nine per cent. of the total. Accordingly when the iron is added by the use of iron chlorid solution as hereinbefore described, such solution will require to be fortified to the proper extent with hydrochloric acid, as need not be further explained.

Other forms may be employed embodying the features of our invention instead of the one here explained, change being made in the form or construction, provided the elements stated by any of the following claims or the equvalent of such stated elements be employed, whether produced by our preferred method or by others embodying steps equivalent to those stated in the following claims.

We therefore particularly point out and distinctly claim as our invention:—

1. In a method of making a refractory material for furnace linings and the like, the steps which consist in burning dolomite, converting a portion of the resulting calcium oxid to calcium chlorid solution, and separating out the residual solid material.

2. In a method of making a refractory material for furnace linings and the like, the steps which consist in burning dolomite, converting a portion of the resulting calcium oxid to calcium chlorid solution, separating out the residual solid material, and adding a suitable fluxing material.

3. In a method of making a refractory material for furnace linings and the like, the steps which consist in burning dolomite, converting a portion of the resulting calcium oxid to calcium chlorid solution, separating out the residual solid material, adding a suitable fluxing material, and heating the mixture to form compact masses of desired shape and size.

4. In a method of making a refractory material for furnace linings, the steps which consist in burning dolomite, treating the resulting oxids with a solution containing iron chlorid, whereby the magnesium oxid is hydrated and the calcium oxid converted into calcium chlorid with precipitation of iron hydrate, and separating out the residual solid material.

5. In a method of making a refractory material for furnace linings, the steps which consist in burning dolomite, treating the resulting oxids with the waste solution from galvanizing pickling baths, whereby the magnesium oxid is hydrated and the calcium oxid converted into calcium chlorid with precipitation of iron hydrate, and separating out the residual solid material.

6. In a method of making a refractory material for furnace linings, the steps which consist in burning dolomite, treating the resulting oxids with a solution containing iron chlorid, whereby the magnesium oxid is hydrated and the calcium oxid converted into calcium chlorid with precipitation of iron hydrate, separating out the residual solid material, and adding a suitable fluxing material.

7. In a method of making a refractory material for furnace linings, the steps which consist in burning dolomite, treating the resulting oxids with a solution containing iron chlorid, whereby the magnesium oxid is hydrated and the calcium oxid converted into calcium chlorid with precipitation of iron hydrate, separating out the residual solid material, adding a suitable fluxing material, and heating the mixture to form compact masses of desired shape and size.

8. In a method of making a refractory material for furnace linings, the steps which consist in burning dolomite, treating the resulting oxids with a solution containing iron chlorid, whereby the magnesium oxid is hydrated and the calcium oxid converted into calcium chlorid with precipitation of iron hydrate, separating out the residual solid material, adding a small percentage of alumina and silica as a flux, and heating the mixture to form compact masses of desired shape and size.

9. A refractory material for furnace-linings and the like, consisting of the constituents of a dolomitic lime, from which a portion of the calcium has been chemically removed, substantially as described.

10. A refractory material for furnace-linings and the like, consisting of the constituents of a dolomitic lime, from which a portion of the calcium has been removed in the form of calcium chlorid, with corresponding substitution of iron hydrate.

11. A refractory material for furnace-linings and the like, consisting of the constituents of a dolomitic lime, from which a portion of the calcium has been removed in the form of calcium chlorid, with corresponding substitution of iron hydrate, and a small percentage of suitable fluxing material added.

12. A refractory material for furnace-linings and the like, consisting of the constituents of a dolomitic lime, from which a portion of the calcium has been removed in the form of calcium chlorid, with corresponding substitution of iron hydrate, and a small percentage of alumina and silica added as a fluxing material.

13. A refractory material for furnace-linings and the like, consisting of heat-compacted masses of desired shape and size made up of the constituents of a dolomitic lime, from which a portion of the calcium has been chemically removed, substantially as described.

14. A refractory material for furnace-linings and the like, consisting of heat-compacted masses of desired shape and size made up of the constituents of a dolomitic lime, from which a portion of the calcium has been chemically removed in the form of calcium chlorid with corresponding substitution of iron hydrate.

15. A refractory material for furnace-linings and the like, consisting of heat-compacted masses of desired shape and size made up of the constituents of a dolomitic lime, from which a portion of the calcium has been chemically removed in the form of calcium chlorid with corresponding substitution of iron hydrate and a small percentage of suitable fluxing material added.

Signed by us, this 16th day of Sept., 1918.

TITUS SHEARD.
HERBERT E. WETHERBEE.